US012595830B2

(12) United States Patent
Shula

(10) Patent No.: US 12,595,830 B2
(45) Date of Patent: Apr. 7, 2026

(54) TORQUE PAD ATTACHMENT ASSEMBLY

(71) Applicant: Honeywell International Inc., Charlotte, NC (US)

(72) Inventor: Brian Shula, South Bend, IN (US)

(73) Assignee: Honeywell International Inc., Charlotte, NC (US)

( * ) Notice: Subject to any disclaimer, the term of this patent is extended or adjusted under 35 U.S.C. 154(b) by 416 days.

(21) Appl. No.: 18/189,689

(22) Filed: Mar. 24, 2023

(65) Prior Publication Data

US 2024/0318697 A1 Sep. 26, 2024

(51) Int. Cl.
F16D 65/097 (2006.01)
B64C 25/42 (2006.01)
(Continued)

(52) U.S. Cl.
CPC .......... F16D 65/0974 (2013.01); B64C 25/42 (2013.01); F16D 55/36 (2013.01); F16D 65/0043 (2013.01); F16D 65/097 (2013.01); F16D 65/0972 (2013.01); F16D 65/122 (2013.01); F16D 2055/0008 (2013.01); F16D 2055/0041 (2013.01); F16D 2055/007 (2013.01); F16D 65/18 (2013.01)

(58) Field of Classification Search
CPC .. F16D 65/0972; F16D 65/0974; F16D 65/18; F16D 65/0043; F16D 65/122; F16D 65/097; F16D 55/36; F16D 2055/0008; F16D 2055/0041; F16D 2055/007
USPC .......... 188/71.5, 73.31, 250 F, 206 R, 206 A
See application file for complete search history.

(56) References Cited

U.S. PATENT DOCUMENTS 4,117,912 A * 10/1978 Ruppe, Jr. ............... F16D 55/40
188/72.3
4,878,563 A 11/1989 Baden et al.
(Continued)

FOREIGN PATENT DOCUMENTS

DE 1260240 B * 2/1968 ............. F16D 65/54
EP 3473880 A1 4/2019
(Continued)

OTHER PUBLICATIONS

Response to Extended Search Report dated Jul. 26, 2024, from counterpart European Application No. 24160484.2 filed Sep. 26, 2024, 16 pp.
(Continued)

*Primary Examiner* — Thomas J Williams
(74) *Attorney, Agent, or Firm* — Shumaker & Sieffert, P.A.

(57) ABSTRACT

In some examples, a brake assembly is configured to compress a brake disc stack to reduce and/or limit rotational motion of a wheel about a wheel axis. The brake assembly is configured to transmit a compression force on the disc stack to a backing plate. The backing plate is configured to transmit the compression force to a torque tube via one or more torque pads. A torque pad includes a pin supported by a support portion of the torque pad. The pin is configured to insert into a support recess of a boss when the boss supports the torque pad. The support portion of the torque pad is resiliently biased, such that the support portion exerts an force on the pin in an inward direction when the pin is displaced in an outward direction opposite the inward direction.

18 Claims, 8 Drawing Sheets

(51) Int. Cl.
    *F16D 55/36*      (2006.01)
    *F16D 65/00*      (2006.01)
    *F16D 65/12*      (2006.01)
    *F16D 65/18*      (2006.01)
    *F16D 55/00*      (2006.01)

(56)      References Cited

U.S. PATENT DOCUMENTS

| | | | |
|---|---|---|---|
| 8,127,899 B2 | 3/2012 | Cress et al. | |
| 10,215,246 B2 | 2/2019 | Finney | |
| 10,228,030 B2 | 3/2019 | Kendricks | |
| 10,677,278 B2 * | 6/2020 | Houser | F16D 65/186 |
| 11,320,010 B2 | 5/2022 | Deng | |
| 2003/0183464 A1 * | 10/2003 | Mao | F16D 65/18 |
| | | | 188/196 P |
| 2008/0142314 A1 | 6/2008 | Scelsi et al. | |

| | | | |
|---|---|---|---|
| 2009/0159379 A1 * | 6/2009 | Monopoli | F16D 65/566 |
| | | | 188/196 BA |
| 2024/0318697 A1 * | 9/2024 | Shula | B64C 25/42 |
| 2024/0344571 A1 * | 10/2024 | Shula | F16D 65/092 |

FOREIGN PATENT DOCUMENTS

| | | | |
|---|---|---|---|
| EP | 3540259 A1 | 9/2019 | |
| EP | 4166808 A1 | 4/2023 | |

OTHER PUBLICATIONS

Mora, "Design of a FSAE Braking System", Thesis, Massachusetts Institute of Technology, Jun. 2018, 43 pp.
Extended Search Report from counterpart European Application No. 24160484.2 dated Jul. 26, 2024, 9 pp.

* cited by examiner

902

EXERTING, USING RESILIENT
BIASING OF A FIRST SUPPORT
PORTION, A FORCE ON A  PIN IN
A DIRECTION TOWARD A
SECOND SUPPORT PORTION.

904

INSERTING, USING THE FORCE,
THE PIN INTO A SUPPORT
RECESS OF A BOSS

906

ENGAGING THE BOSS USING
THE FIRST SUPPORT PORTION
AND THE SECOND SUPPORT
PORTION.

TORQUE PAD ATTACHMENT ASSEMBLY

TECHNICAL FIELD

The present disclosure relates to a brake assembly of a vehicle.

BACKGROUND

Vehicles, such as aircrafts, may use a wheel brake assembly that includes a multi-disc brake assembly. For example, the multi-disc brake assembly may include a disc stack comprising a plurality of rotor discs engaged with a wheel and a plurality of stator discs interleaved with the rotor discs. The rotor discs and wheel are configured to rotate around an axle, while the stator discs remain stationary. To decelerate rotational motion of a rotating wheel, the brake assembly may displace pistons against a pressure plate to compress the rotating rotor discs engaged with the wheel against the stationary stator discs, therefore producing torque that decelerates the rotational motion of the wheel. In some examples, the rotor discs may be engaged with the wheel via rotor drive keys positioned on an interior surface of the wheel. In some examples, stator discs may be engaged with a stationary torque tube surrounding the axle via splines positioned on the torque tube. In some such examples, the brake assembly may be configured to compress the rotor discs and the stator discs between the piston and a backing plate supported by the torque tube.

SUMMARY

The present disclosure describes example brake assemblies utilized to reduce and/or substantially prevent a rotation of a wheel. The brake assembly is configured to compress a brake disc stack to reduce and/or limit rotational motion of the wheel about the wheel axis. The brake assembly is configured to transmit a compression force on the disc stack to a backing plate. The backing plate is configured to transmit the compression force to a torque tube via one or more torque pads of the brake assembly. The brake assembly is configured to support the torque pad using a boss (e.g., a protrusion) of the brake assembly, such as a boss defined by the torque tube.

The torque pad includes a pin supported by a support portion of the torque tube. The pin is configured to insert into a support recess of the boss when the boss supports the torque pad. The support portion of the torque pad is resiliently biased, such that the support portion exerts a force on the pin in an inward direction (e.g., toward the support recess) when the pin is displaced in an outward direction opposite the inward direction. The force on the pin may assist in maintaining the pin within the support recess during operations of the brake assembly. In examples, the resilient biasing of the support portion allows positioning of the pin during an installation of the torque pad in the brake assembly. In some examples, the insertion of the pin within the support recess may allow the coupling of the torque pad and the boss without a need for additional installation of additional fastening elements, such as cotter pins or other fastening elements.

In some examples, a torque pad comprises: a pad body defining a front portion and a back portion opposite the front portion, the front portion defining a pad face configured to engage a backing plate of a braking system, wherein the back portion defines a first support portion and a second support portion separated from the first support portion, wherein the first support portion and the second support portion are configured to receive a boss of the braking system such that the boss supports the pad body, wherein the first support portion supports a pin configured to insert into a support recess of the boss when the boss supports the pad body, and wherein the first support portion is resiliently biased to exert a force on the pin in a direction toward the second support portion when the pin is displaced in a direction away from the second support portion.

In some examples, a torque pad comprises: a pad body defining a front portion and a back portion opposite the front portion, the front portion defining a pad face configured to engage a backing plate of a braking system and a back face opposite the pad face, wherein the back portion defines a first support portion and a second support portion separated from the first support portion, wherein the first support portion and the second support portion are configured to engage a torque tube boss of a torque tube such that the torque tube boss supports the pad body, wherein the first support portion defines a first pin configured to insert into a support recess of the torque tube boss when the torque tube boss supports the pad body, wherein the second support portion defines a second pin configured to insert into a second support recess of the torque tube boss when the torque tube boss supports the pad body, wherein the first support portion is resiliently biased to exert a force on the first pin in a direction toward the second pin when the first pin is displaced in a direction away from the second pin, and wherein the first pin is configured to move relative to the back face when the first pin is displaced in the direction away from the second pin.

In some examples, a method comprises: exerting, using resilient biasing of a first support portion of a back portion of a torque pad, a force on a pin supported by the first support portion in a direction toward a second support portion of the back portion, wherein the first support portion exerts the force in the direction toward the second support portion when the pin is displaced in a direction away from the second support portion; inserting, using the force on the pin, the pin into a support recess of a boss of a brake assembly, wherein the torque pad includes a pad body defining the back portion and a front portion opposite the back portion, the front portion defining a pad face configured to engage a backing plate of the brake assembly; and engaging the boss using the first support portion and the second support portion such that the boss supports the pad body.

The details of one or more examples are set forth in the accompanying drawings and the description below. Other features, objects, and advantages will be apparent from the description and drawings, and from the claims.

DETAILED DESCRIPTION

Figure 1:
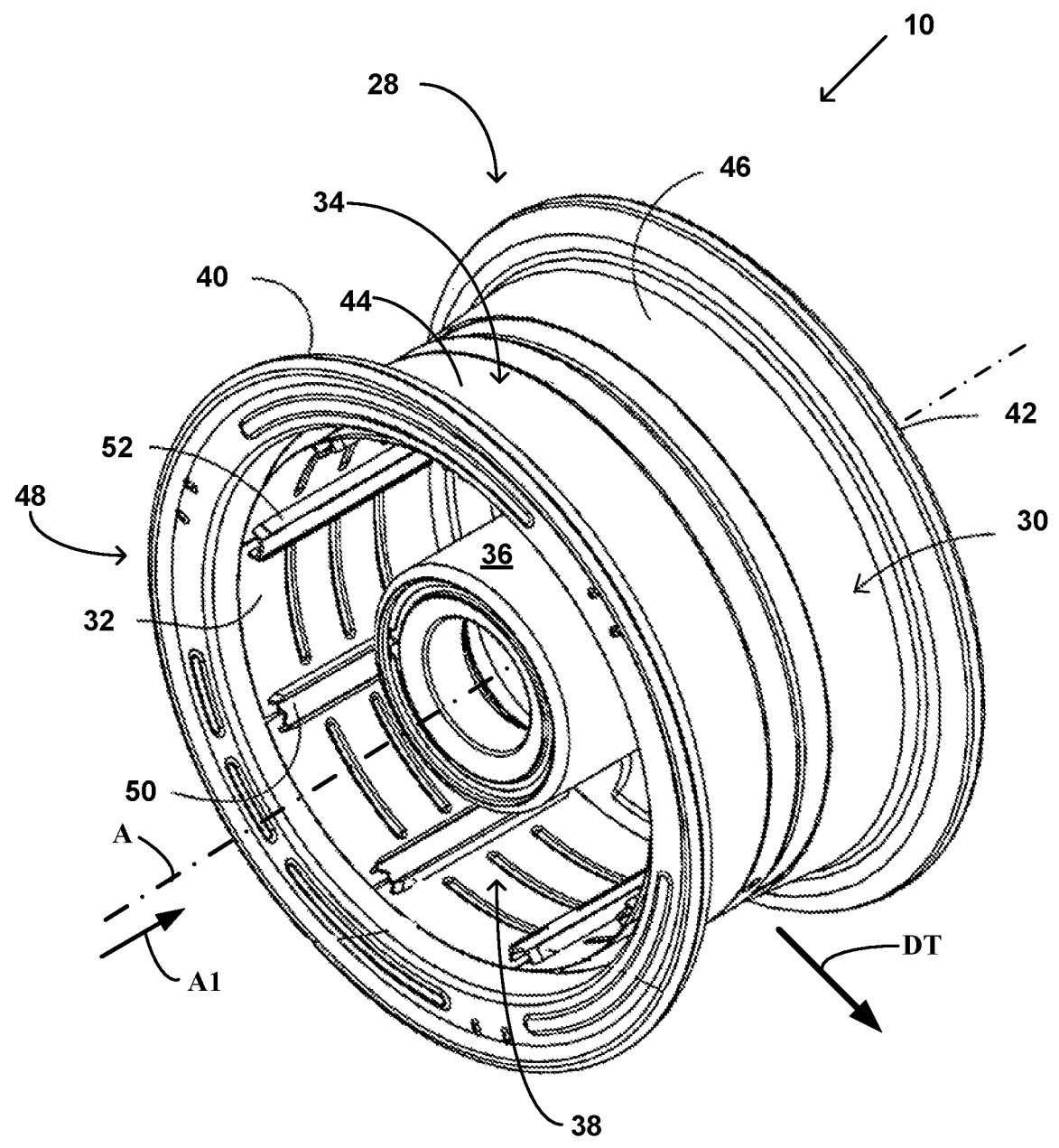
FIG. 1 is a perspective view illustrating an example wheel including a plurality of rotor drive keys on an interior surface of the wheel.

The disclosure describes articles, systems, and techniques relating to an assembly comprising a wheel and a brake assembly, and, in particular, an assembly including a torque pad supported by a torque tube of the brake assembly. The wheel is configured to rotate around a wheel axis. The brake assembly includes a disc stack which includes one or more rotor discs and one or more stator discs. For example, the disc stack may include a plurality of rotor discs interleaved with a plurality of stator discs. The rotor discs are rotationally coupled with the wheel, such that a rotation of the wheel around the wheel axis causes rotation of the rotor discs around the wheel axis. The stator discs are configured to remain substantially stationary relative to the wheel and the rotor discs. The brake assembly is configured to compress the disc stack to cause engagement of friction surfaces on the rotating rotor discs and the stationary stator discs, reducing a rotational speed of the rotor discs around the wheel axis. The rotor discs are configured to engage the wheel, such that the reduction in the rotational speed of the rotor discs causes a reduction in the speed of the wheel. The brake assembly is configured to compress the disc stack against a backing plate supported by a torque tube.

In examples, the brake assembly is configured to compress the disc stack (e.g., using an actuator) between a pressure plate and a backing plate to cause engagement of friction surfaces within the disc stack. The brake assembly includes a torque pad configured to couple the backing plate and the torque tube. The braking system may be configured such that, when the actuator exerts a compression force to compress the disc stack against the backing plate (e.g., to slow the wheel), the backing plate transmits at least some portion of the compression force via the torque pad to the supporting torque tube. In examples, the torque pad includes a pad body defining a pad face configured to receive the compression force from the backing plate and transmit the compression force to the torque tube via a back portion engaged with the torque tube. In examples, the back portion defines a back face configured to transmit the compression force to the torque tube.

The brake assembly is configured to support the torque pad using a boss (e.g., a protrusion) of the brake assembly. In examples, the boss is a torque tube boss defined by the torque tube. The boss may be configured to limit movement of the torque pad in an axial direction of the wheel, a radial direction of the wheel, and/or a tangential direction of the wheel. The assemblies disclosed herein include a torque pad configured to couple to the boss (e.g., the torque tube boss) by inserting a pin defined by the back portion of the pad body into a support recess defined by the boss. The pin is supported and/or defined by a first support portion of the torque pad. The torque pad is configured to engage the boss using the first support portion and a second support portion separated from the first support portion such that the boss supports the pad body. In examples, the first support portion and the second support portion define a boss recess configured to receive the boss when the pin is inserted within the support receptacle of the boss.

The first support portion (e.g., the portion defining the pin) is resiliently biased to exert a force on the pin in a direction toward the second support portion when the pin is displaced in a direction away from the second support portion. For example, when the brake assembly is configured to exert the compression force on the disc stack in a direction substantially parallel to an axis of the wheel, the first support portion may be resiliently biased to exert the force on the pin in an inward radial direction substantially perpendicular to the wheel axis when the pin is displaced in a away from the second support portion in an outward radial direction opposite the inward radial direction. The exertion of force on the pin may assist in retaining the pin within the support recess during operation of the brake assembly such that, for example, the boss may act to limit movement of the torque pad (e.g., movement relative to the torque tube) in an axial direction, radial direction, and/or a tangential direction of the wheel during the brake assembly operation. The exertion of force may assist the pin in holding (e.g., retaining) the torque pad on the boss (e.g., a torque tube boss) during sub-assembly steps when, for example, the torque tube and the boss-supported torque pad may be moved to various locations, such as to storage or to a new location for further assembly.

In examples, the second support portion defines a second pin configured to insert within a second support recess of the boss when the pin inserts into the support recess. In examples, the pin extends from the first base section in a first direction (e.g., the inward radial direction), and the second pin extends from second support portion in a second direction (e.g., outward radial direction) opposite the first direction. In examples, the support recess (in which the first pin inserts) and the second support recess (in which the second pin inserts) are on substantially opposite sides of the boss, such that the first pin and the second pin act to substantially bracket the boss when the first pin inserts into the support recess and the second pin inserts into the second support recess. The resilient biasing of the first base section may exert the force on the pin in a direction toward the second pin when the pin is displaced in a direction away from the second pin to assist in maintaining the pin in the support recess and the second pin in the second support recess.

The torque pad may be configured such that an installer may cause the displacement of the pin from the second support portion during installation of the torque pad within the brake assembly. For example, the torque pad may be configured such that, with the torque pad (e.g., the second support portion and/or the second pin) engaged with the boss, the installer may displace the pin in a direction away from the second support portion to position the pin for insertion within the support recess of the boss. The installer may subsequently release the pad body to allow the resilient biasing of the first support portion to position and/or insert the pin into the support recess, such that the boss acts to limit movement of the torque pad in an axial direction, radial direction, and/or a tangential direction of the wheel. In examples, the torque pad is configured such that the resilient biasing acts to position and/or substantially establish the pin within the support recess (and, e.g., substantially establish the second pin within its position in the second support recess) allows for installation of the torque pad without a necessity for installation of additional fastening elements to couple the torque pad and the boss. For example, the resilient biasing may allow the coupling of the torque pad and the boss without a need for additional installation of one or more cotter pins or other fastening elements to couple the torque pad and the boss. In some examples, the torque pad includes a tab configured to displace the pin from the second support portion when a force in a direction away from the second support portion is exerted (e.g., exerted by an installer) on the tab.

The pin may be configured to move relative to the back face of the torque pad when the pin is displaced in the direction away from the second support portion. In examples, the first support portion defines a ligament (configured similar to, for example, a leaf spring) configured to support the pin in a manner allowing the pin to move relative to the back face. The ligament may include a first end attached to the pad body and a second end supporting (e.g., attached to) the pin. The ligament may be configured such that displacement of the pin relative to the back face causes movement of the second end of the ligament relative to the first end of the ligament. In examples, the ligament is configured to exert the force on the pin toward the second support portion when the second end is displaced relative to the first end in the direction away from the second support portion.

Hence, the torque pad may be configured to couple to a boss of a brake assembly (e.g., a torque tube boss) using a pin supported by first base section and configured to insert into a support recess of the boss. The first base section is resiliently biased to substantially position and/or maintain the pin within the support recess, such that the boss acts to limit movement of the torque pad in the axial direction, radial direction, and/or a tangential direction of the wheel. In examples, the first pin and a second pin act to substantially bracket the boss when the first pin inserts into the support recess and the second pin inserts into a second support recess. The installer may displace the pin in a direction away from the second support portion to position the pin for insertion within the support recess of the boss. The torque pad may be configured such that an installer may displace the pin from the second support portion to position and/or insert the pin into the support recess, and subsequently release the pad body to allow the resilient biasing of the first support portion to substantially maintain the pin in the support recess. Thus, the torque pad may be configured to allow the coupling of the torque pad and the boss without a need for additional installation of one or more cotter pins or other fastening elements to couple the torque pad and the boss.

Figure 2:
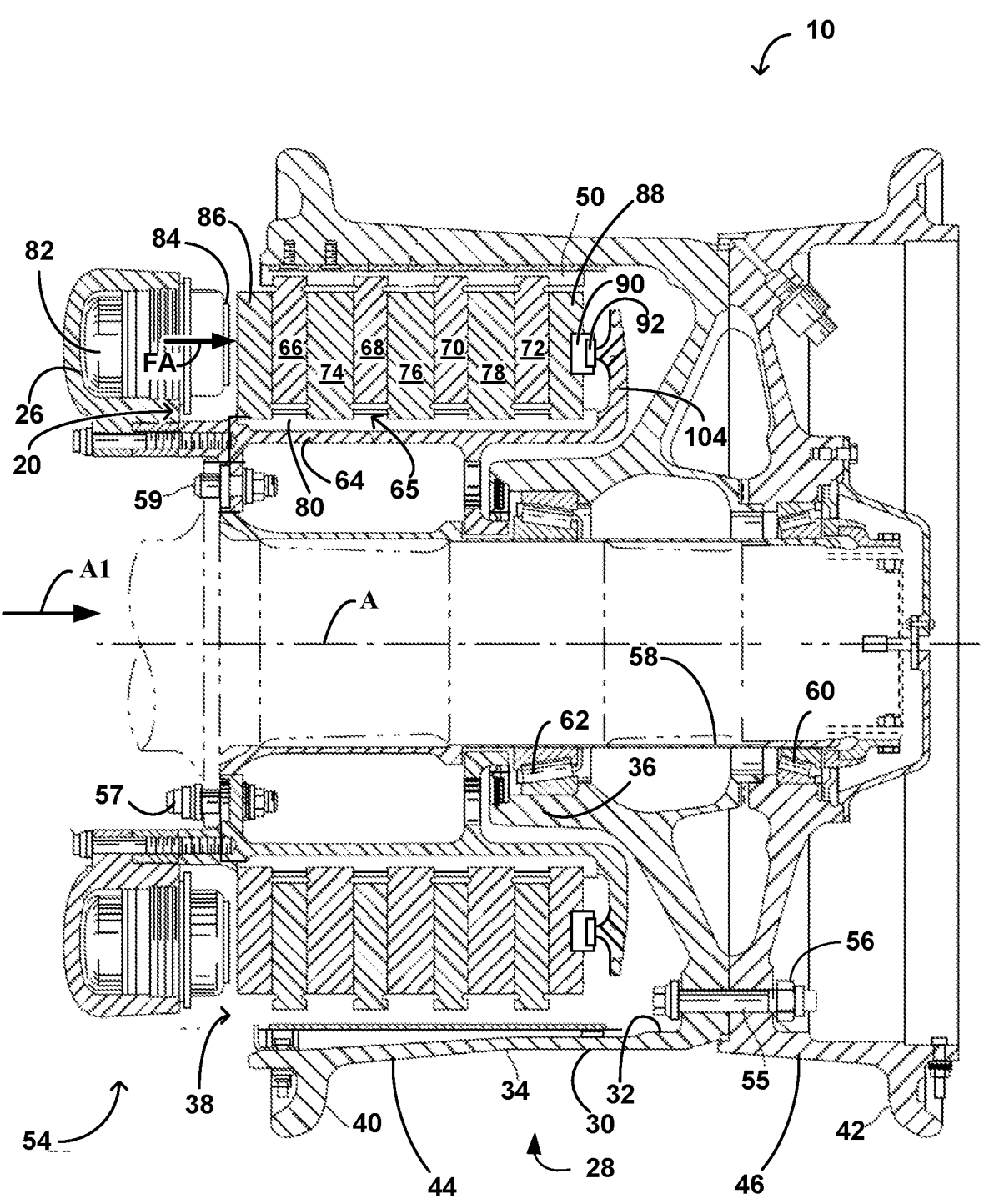
FIG. 2 is a schematic cross-sectional view illustrating an example wheel and brake assembly including the wheel of FIG. 1.

FIG. 1 is a perspective view illustrating an example wheel 10 configured to rotate around an axis of rotation A. In examples, wheel 10 is a part of an aircraft vehicle. In other examples, wheel 10 may be a part of any other vehicle, such as, for example, any land vehicle or other vehicle. FIG. 2 is a schematic cross-sectional view illustrating wheel 10 and an example brake assembly 54 configured to decelerate a rotation of wheel 10 using an actuator 82 to compress a disc stack 65 (e.g., between a pressure plate 86 and a backing plate 88). The cross-section of FIG. 2 is illustrated with a cutting plane perpendicular to the axis of rotation A.

In the example shown in FIG. 1, wheel 10 includes a wheel rim 28 defining an exterior surface 30 and interior surface 32. Wheel rim 28 includes tubewell 34 and wheel hub 36. Interior surface 32 and wheel hub 36 may define a wheel cavity 38 (e.g., a volume) between interior surface 32 and wheel hub 36. In some examples, a tire (not shown) may be mounted on exterior surface 30 of wheel rim 28. Wheel 10 may include an inboard bead seat 40 and an outboard bead seat 42 configured to retain a tire on exterior surface 30 of wheel rim 28. In examples, wheel 10 may comprise an inboard section 44 (e.g., including inboard bead seat 40) and an outboard section 46 (e.g., including outboard bead seat 42). Wheel 10 may define an axial direction A1 parallel to the axis of rotation A. Wheel 10 may be configured to travel in a direction substantially perpendicular to axial direction A1 when wheel 10 rotates around axis of rotation A.

Wheel 10 includes a plurality of rotor drive keys 48 on interior surface 32 of wheel 10, such as rotor drive key 50 and rotor drive key 52. In some examples, each rotor drive key of the plurality of rotor drive keys 48 extends in a substantially axial direction of wheel 10 (e.g., in a direction parallel to the axis of rotation A). The plurality of rotor drive keys 48 ("rotor drive keys 48") and interior surface 32 are configured to be substantially stationary with respect to each other, such that when wheel 10 (and interior surface 32) rotates around axis of rotation A, each of the rotor drive keys (e.g., rotor drive keys 50, 52) translates over a closed path around axis A. Consequently, when wheel 10, interior surface 32, and rotor drive keys 48 are rotating around axis of rotation A, a force on one or more of rotor drive keys 48 opposing the direction of rotation acts to slow or cease the rotation. As will be discussed, rotor drive keys 48 may be configured to receive a torque from a braking system (not shown) configured to reduce and/or cease a rotation of wheel 10. Rotor drive keys 48 may be integrally formed with interior surface 32, or may be separate from and mechanically affixed to interior surface 32.

FIG. 2 is a schematic cross-sectional view illustrating wheel 10 with a brake assembly 54 positioned at least partially within wheel cavity 38. FIG. 2 illustrates wheel rim 28 as a split rim wheel with lug bolt 55 and lug nut 56 connecting inboard section 44 and outboard section 46, however wheel rim 28 may utilize other configurations (e.g., a unified wheel rim) in other examples. An axial assembly 58 is configured to support wheel 10 while allowing wheel 10 to rotate around axis A using bearing 60 and bearing 62. For example, bearings 60, 62 may define a substantially circular track around axial assembly 58. In examples, axis A extends through axial assembly 58. A torque tube 64 is coupled to axial assembly 58, such that torque tube 64 remains substantially rotationally stationary when wheel 10 rotates around axial assembly 58 and axis A. Torque tube 64 may at least partially surround an exterior of axial assembly 58. Axial assembly 58 may be mechanically coupled to a strut or some other portion of a vehicle using, for example, bolts 57 and/or bolts 59, or some other fastening device. Wheel 10 is shown and described to provide context to the brake assembly described herein, however the brake assembly described herein may be used with any suitable wheel assembly in other examples.

In the example shown in FIG. 2, brake assembly 54 is positioned within wheel 10 (e.g., wheel cavity 38) and configured to engage torque tube 64 and rotor drive key 50. Brake assembly 54 is configured to generate a torque to oppose a rotation of wheel 10 around axis A and transfer the torque to rotor drive key 50, reducing and/or eliminating the rotation of wheel 10 around axis A. Brake assembly 54 includes disc stack 65 which includes one or more rotor discs (e.g., rotor discs 66, 68, 70, 72) and one or more stator discs (e.g., stator discs 74, 76, 78). Rotor discs 66, 68, 70, 72, and/or stator discs 74, 76, 78 may have any suitable configuration. For example, rotor discs 66, 68, 70, 72 and/or stator discs 74, 76, 78 can each be substantially annular discs surrounding axial assembly 58. Stator discs 74, 76, 78 are coupled to torque tube 64 via a spline 80 and remain rotationally stationary with torque tube 64 (and axial assembly 58) as wheel 10 rotates. Rotor discs 66, 68, 70, 72 are rotationally coupled to rotor drive key 50 and interior surface 32 and rotate substantially synchronously with wheel 10 around axis A.

Brake assembly 54 includes an actuator 82 configured to compress disc stack 65 to bring friction surfaces of rotor discs 66, 68, 70, 72 into contact with friction surfaces of stator discs 74, 76, 78 to generate shearing forces between the discs. The shearing forces cause rotor discs 66, 68, 70, 72 to exert a torque on rotor drive key 50 opposing a rotation of wheel 10. In examples, actuator 82 is configured to cause a piston 84 to translate (e.g., translate substantially parallel to axis A) to compress disc stack 65. Actuator 82 may cause piston 84 to translate using any suitable process. In some examples, actuator 82 is configured to cause translation of piston 84 by supplying and/or venting a pressurized hydraulic fluid to or from a piston chamber. In addition or instead, in some examples, actuator 82 is configured to cause piston 84 to translate through a motion (e.g., a rotary motion) generated by an electric motor.

In examples, actuator 82 is configured to compress disc stack 65 using a pressure plate 86 and/or backing plate 88. For examples, actuator 82 may be configured to exert an actuator force FA (e.g., using piston 84) to cause compression of disc stack 65 substantially between pressure plate 86 and backing plate 88. In examples, backing plate 88 may be supported by torque tube 64. For example, backing plate 88 may be configured to be substantially stationary with respect to torque tube 64. Wheel 10 may rotate around backing plate 88 when wheel 10 rotates around torque tube 64. Brake assembly 54 may be configured such that the actuator force FA exerted on disc stack 65 by actuator 82 causes disc stack 65 to translate toward backing plate 88. For example, the actuator force FA may cause rotor discs 66, 68, 70, 72 to translate over rotor drive key 50 toward backing plate 88 and cause stator discs 74, 76, 78 to translate over spline 80 toward backing plate 88.

Backing plate 88 is configured to resist the translation of disc stack 65 and exert a reaction force on disc stack 65 opposite the actuator force FA exerted by actuator 82, such that disc stack 65 is compressed by actuator 82 between pressure plate 86 and backing plate 88. When torque tube 64 supports backing plate 88, backing plate 88 may transfer a compression force to torque tube 64 in response to the actuator force FA. For example, the compression force may a force having a directionality substantially similar to actuator force FA and a magnitude equal to at least some portion of actuator force FA.

Brake assembly 54 may include a torque pad 90 configured to transfer the compression force from backing plate 88 to torque tube 64. Torque pad 90 is supported by a boss 92 of brake assembly 54. In examples, boss 92 is a torque tube boss supported and/or defined by torque tube 64. Brake assembly 54 may be configured such that backing plate 88 transmits the compression force to torque pad 90, and torque pad 90 transmits the compression force via boss 92 to torque tube 64. In examples, torque pad 90 is configured to insert into a pocket (e.g., backing plate pocket 114 (FIG. 4)) of backing plate 88 when boss 92 supports torque pad 90.

Thus, brake assembly 54 may be utilized to reduce and/or eliminate the rotation of wheel 10 using a compression force by actuator 82 exerted on disc stack 65. Backing plate 88 may be configured to react against the compression force, causing a compression of disc stack 65. Torque tube 64 may be configured to support backing plate 88, such that torque tube 64 experiences a force (e.g., substantially parallel to axis A) when actuator 82 exerts the compression force on disc stack 65.

Wheel 10 may be used with any variety of private, commercial, or military aircraft or other type of vehicle. Wheel 10 may be mounted to a vehicle via, for example, axial assembly 58. Axial assembly 58 may be mounted on a strut of a landing gear (not shown) or other suitable component of a vehicle to connect wheel 10 to the vehicle. Wheel 10 may rotate around axis A and axial assembly 58 to impart motion to the vehicle. Wheel 10 is shown and described to provide context to the brake assembly described herein, however the brake assembly described herein may be used with any suitable wheel assembly in other examples.

Figure 3:
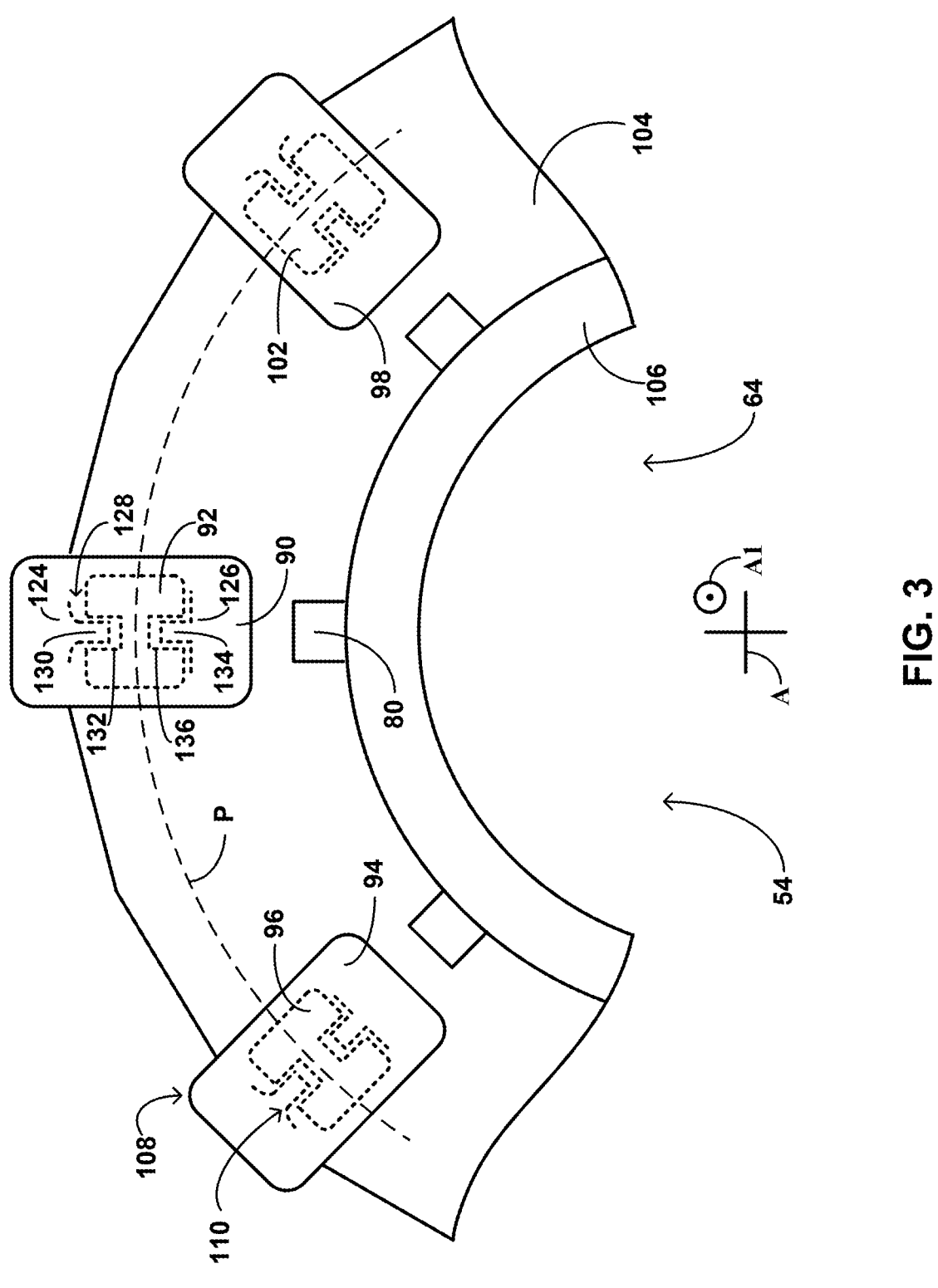
FIG. 3 is a plan view illustrating portions of a brake assembly and a plurality of torque pads viewed from a direction opposite an axial direction of the brake assembly.

FIG. 3 illustrates a schematic view of brake assembly 54 viewed in the direction of axial direction A1. In FIG. 3, axial direction A1 is parallel to axis of rotation A and depicted proceeding out of the page. FIG. 3 depicts torque tube 64 and a plurality of torque pads including torque pad 90 supported by boss 92, second torque pad 94 supported by second boss 96, and third torque pad 98 supported by third boss 102. In FIG. 3, boss 92 is hidden by torque pad 90. Second boss 96 is hidden behind second torque pad 94, and third boss 102 is hidden behind third torque pad 98, and each are illustrated with dashed lines. In examples, torque tube 64 includes a flange 104 ("torque tube flange 104") supporting boss 92, second boss 96, and/or third boss 102 ("bosses 92, 96, 102"). In examples, torque tube flange 104 extends outward from a body 106 of torque tube 64 ("torque tube body 106"). In some examples, torque tube flange 104 defines bosses 92, 96, 102. Torque tube body 106 may define a substantially annular body surrounding axis of rotation A. Torque tube flange 104 may extend radially outward (relative to axis of rotation A) from torque tube body 106.

Figure 4:
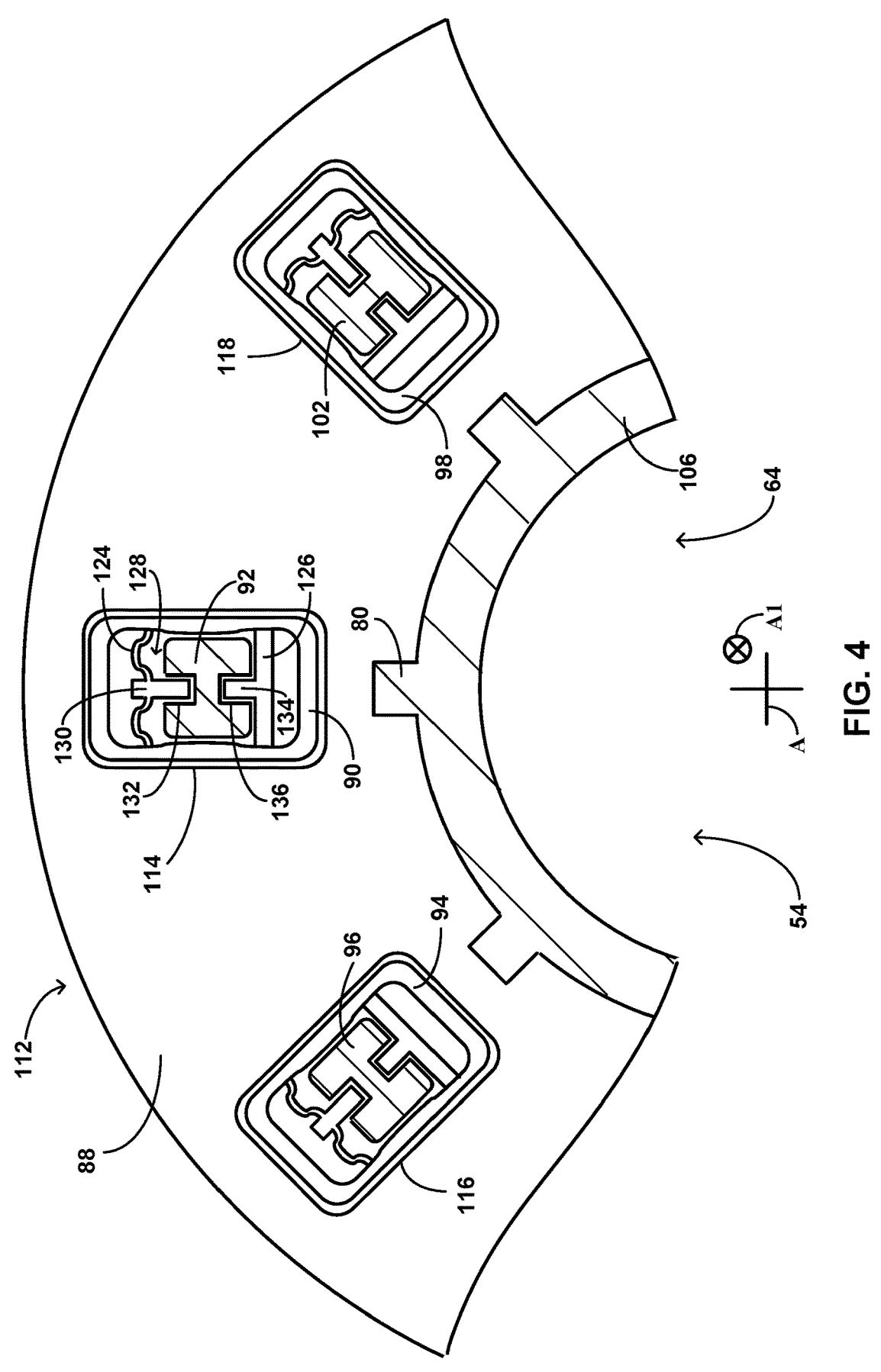
FIG. 4 is a plan view with selected cross-sections illustrating portions of the brake assembly of FIG. 3 and a plurality of torque pads viewed in the axial direction of the brake assembly, with the cutting plane taken perpendicular to the axial direction.
Figure 5:
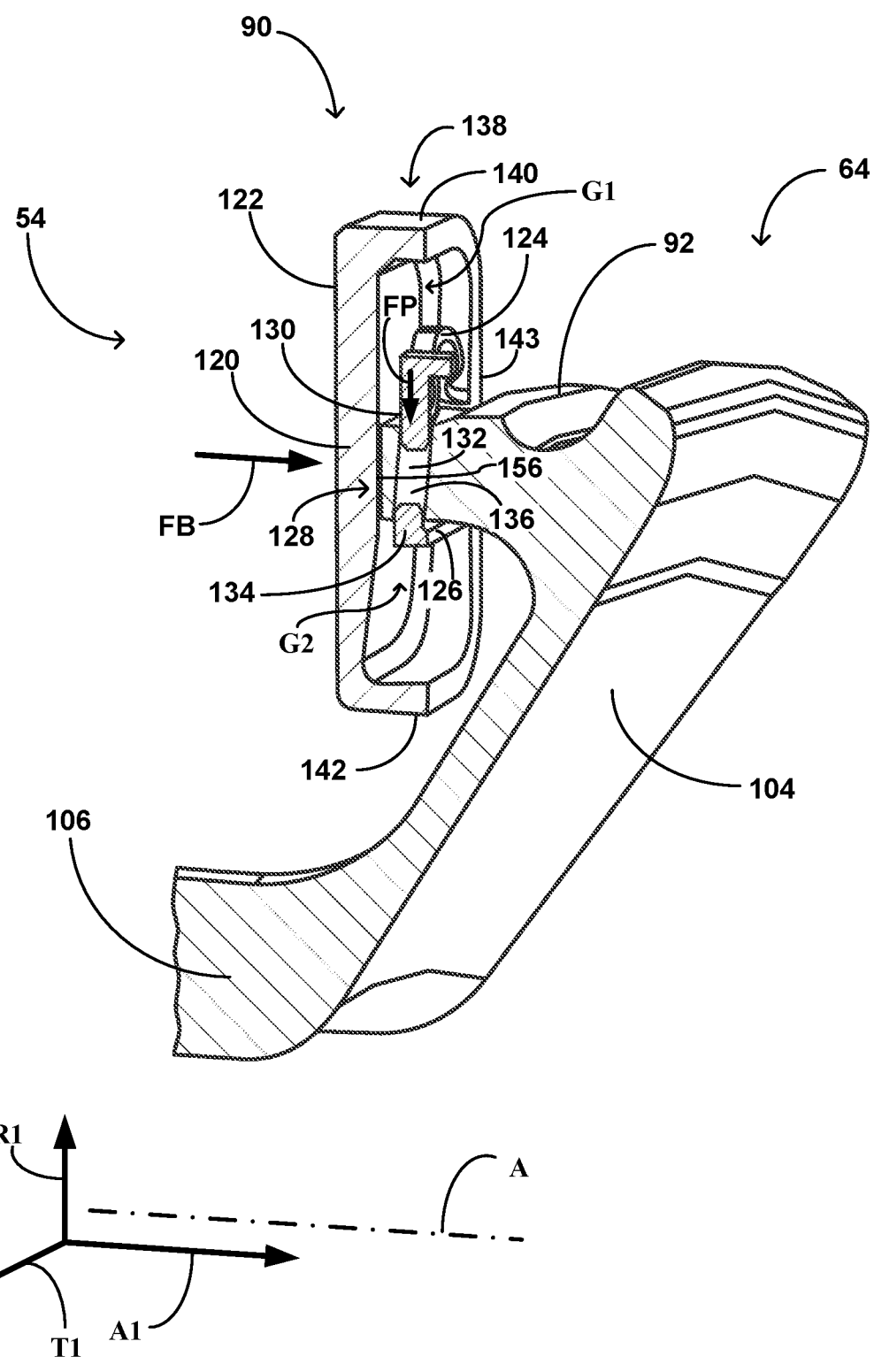
FIG. 5 is a perspective cross-section of a torque pad supported by a torque tube, with the cutting plane taken parallel to the axial direction and a radial direction of the brake assembly.

FIG. 4 illustrates a schematic cross-sectional view of brake assembly 54 viewed in a direction opposite axial direction A1, with the cutting plane taken perpendicular to axial direction A, parallel to the page, and extending between torque tube flange 104 and torque pad 90, second torque pad 94, and third torque pad 98 ("torque pads 90, 94, 98"), such that the cutting plane intersects bosses 92, 96, 102. In FIG. 4, axial direction A1 is parallel with axis of rotation A and depicted proceeding into the page. FIG. 5 includes a portion of backing plate 88 supported by torque tube 64. FIG. 5 illustrates a perspective cross-sectional view of a section of torque tube 64 supporting torque pad 90, with a cutting plane intersecting axial direction A1 and passing through boss 92 and torque pad 90. Axial direction A1 is parallel with axis of rotation A in FIG. 5.

Brake assembly 54 may include a plurality of torque pads 108 ("torque pads 108") which include, for example, torque pads 90, 94, 98. Torque pads 108 may include any number of torque pads, including more or less torque pads than those represented by torque pads 90, 94, 98. In examples, brake assembly 54 is configured such that torque pads 108 are substantially arranged around a perimeter P surrounding axial direction A1. One or more of (e.g., each of) torque pads 108 may be configured to transmit a compression force from backing plate 88 to at least one of bosses 92, 96, 102. In examples, brake assembly 54 includes a plurality of bosses 110 ("bosses 110") which include, for example, bosses 92, 96, 102. Bosses 110 may include any number of bosses, including more or less bosses than those represented by bosses 92, 96, 102. In examples, brake assembly 54 is configured such that bosses 92, 96, 102 are substantially arranged around the perimeter P. One or more of (e.g., each of) bosses 92, 96, 102 may be configured to transmit a compression force from at least one of torque pads 90, 94, 98 to torque tube 64 (e.g., torque tube flange 104). Torque tube flange 104 may be configured to transmit the compression force to torque tube body 106.

In examples, backing plate 88 defines a plurality of backing plate pockets 112 ("backing plate pockets 112) with each backing plate pocket configured to receive one of torque pads 108 when bosses 110 support torque pads 108.). For example, backing plate 88 may define backing plate pocket 114 configured to receive torque pad 90, second backing plate pocket 116 configured to receive second torque pad 94, and/or third backing plate pocket 118 configured to receive third torque pad 98. In examples, backing plate pockets 112 are configured such that each torque pad of torque pads 108 reside within backing plate pockets 112 substantially concurrently. For example, backing plate pockets 112 may be configured such that torque pad 90 resides within backing plate pocket 114 when second torque pad 94 resides within second backing plate pocket 116 and third torque pad 98 resides within third backing plate pocket 118.

Referring to FIG. 5, backing plate 88 is configured to exert a force FB on torque pad 90 in response to the exertion of actuator force FA (FIG. 2) on disc stack 65 by actuator 82. In examples, torque pad 90 includes a body 120 ("pad body 120") defining a pad face 122 configured to engage backing plate 88 when backing plate 88 exerts the force FB on torque pad 90. In examples, torque pad 90 is configured such that backing plate 88 exerts the force FB on pad face 122. Pad body 120 is configured to transmit the force FB to boss 92 when backing plate 88 exerts the force FB. Boss 92 is configured to transmit the force FB to a portion of torque tube 64 (e.g., torque tube flange 104 and/or torque tube body 106). In some examples, such as illustrated at FIG. 5, boss 92 is a torque tube boss defined by torque tube 64 (e.g., torque tube flange 104), such that boss 92 forms a substantially unitary component with torque tube 64 (e.g., torque tube flange 104). In examples, actuator force FA and force FB are substantially parallel to axis A. Each of torque pads 108 may be configured to receive a force such as force FB from backing plate 88.

Torque pad 90 includes a first support portion 124 and a second support portion 126 defining a boss recess 128 configured to receive (e.g., engage) boss 92 when torque pad 90 couples to boss 92. In examples, torque pad 90 is configured such that boss 92 acts to limit movement of torque pad 90 (e.g., movement relative to torque tube 64) in the axial direction A1, a radial direction R1 perpendicular to the direction A1, or a tangential direction T1 perpendicular to the direction A1 and the direction R1 (e.g., when boss recess 128 receives boss 92 and/or backing plate pocket 114 receives torque pad 90). In FIG. 5 and elsewhere, the axial direction A1, the radial direction R1, and the tangential direction T1 define a right-handed coordinate system which satisfies the right hand rule.

As depicted in FIGS. 3-5, torque pad 90 includes a pin 130 configured to insert within a support recess 132 of boss 92 when torque pad 90 couples to boss 92. Torque pad 90 is resiliently biased to exert a pin force FP on pin 130 tending to keep pin 130 positioned within support recess 132 when boss 92 is positioned within boss recess 128. Torque pad 90 may be resiliently biased to exert pin force FP on pin 130 in a direction from first support portion 124 to second support portion 126 when pin 130 is displaced in a direction away from second support portion 126. In examples, second support portion 126 defines a second pin 134 configured to insert within a second support recess 136 defined by boss 92 when pin 130 inserts into support recess 132. In examples, pin 130 extends from first support portion 124 in a first direction (e.g., in a direction opposite radial direction R1) and second pin 134 extends from second support portion 126 in a second direction substantially opposite the first direction (e.g., in the radial direction R1).

Although the following examples discuss pin 130 extending toward and/or moving toward second support portion 126 in a direction opposite the radial direction R1 for illustrative purposes, the following descriptions may apply to a torque pad 90 including a pin configured to move toward a second base section in the radial direction R1, the tangential direction T1, a direction opposite the tangential direction T1, the axial direction A1, a direction opposite the axial direction A1, or some other direction defined by the A1-R1-T1 axes.

Figure 6:
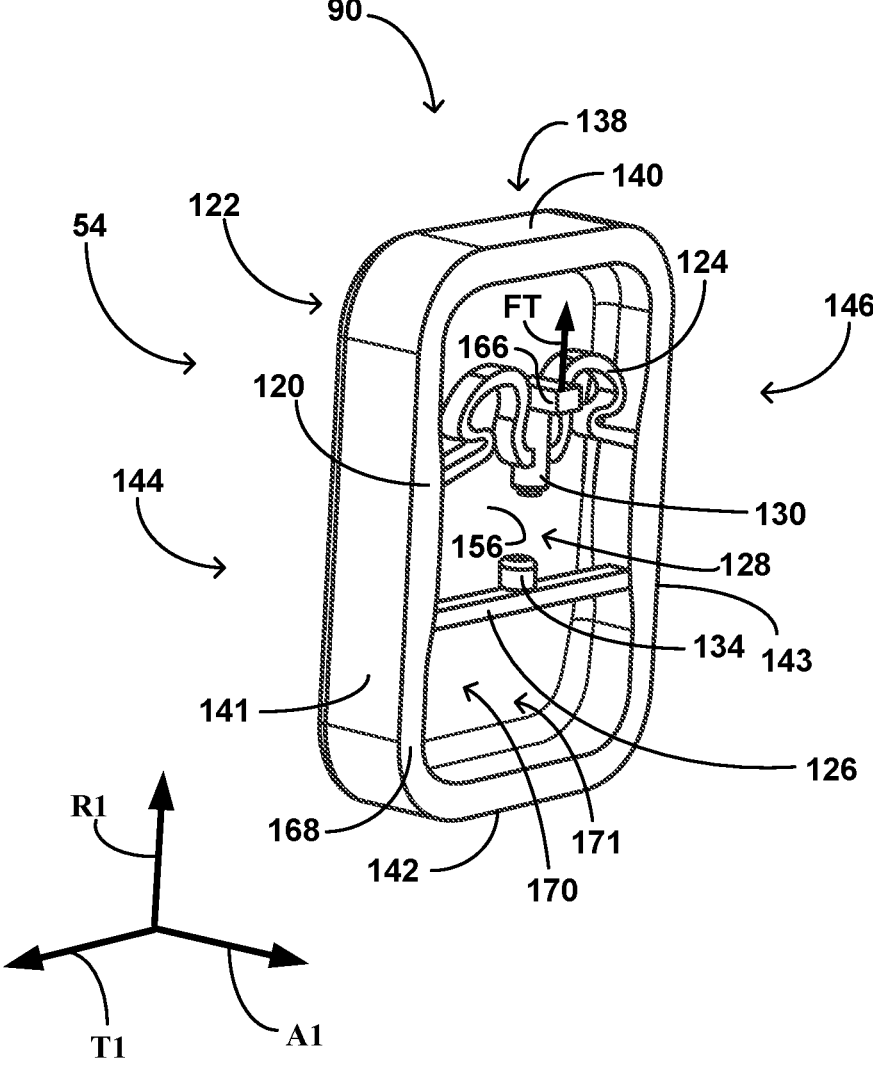
FIG. 6 is a perspective of an example torque pad.
Figures 7, 8:
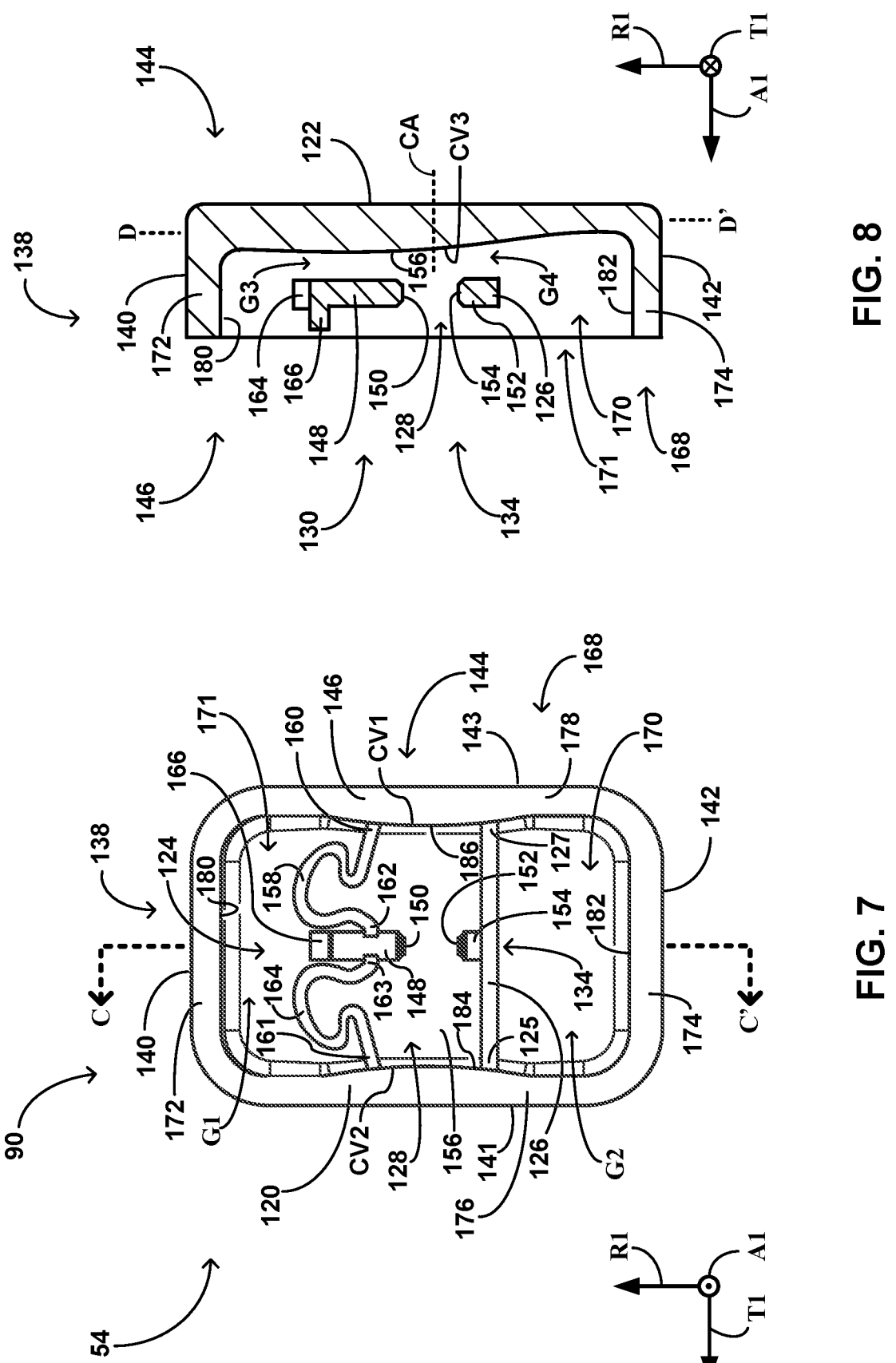
FIG. 7 is a plan view of a back portion of an example torque pad.
FIG. 8 is a schematic cross section of an example torque pad, with the cutting plane taken parallel to the radial direction and the tangential direction of the brake assembly.

FIG. 6 is a schematic perspective view illustrating torque pad 90 in accordance with the axes shown. FIG. 7 is a schematic plan view illustrating torque pad 90 in accordance with the axes shown, with the axial direction A1 proceeding out of the page. FIG. 8 is schematic cross-section view illustrating torque pad 90 in accordance with the axes shown with tangential direction T1 proceeding into the page, and with the cutting plane represented by C-C' in FIG. 7.

Pad body 120 includes a front portion 144 ("pad front portion 144") and a back portion 146 ("pad back portion 146"). Torque pad 90 is configured such that pad front portion 144 receives the force FB from backing plate 88 when boss 92 (FIGS. 2-5) support torque pad 90 and brake assembly 54 (e.g., actuator 82) exerts the actuator force FA on disc stack 65. Pad body 120 is configured to transmit the force FB from pad front portion 144 to pad back portion 146. Pad back portion 146 is configured to transmit the force FB to boss 92 when boss 92 supports torque pad 90. In examples, front portion 144 and back portion 146 may be separated substantially by, for example, a plane D-D' parallel to and/or defined by the R1-T1 axes and extending through pad body 120 (FIG. 8).

Pad front portion 144 defines pad face 122. Pad face 122 is configured to engage backing plate 88 at least when backing plate 88 transmits the force FB to torque pad 90. In examples, pad face 122 is configured such that pad front portion 144 fits within (e.g., may position in) backing plate pocket 114 (e.g., when boss 92 supports torque pad 90). Torque pad 90 may be configured to receive the force FB from backing plate 88 via pad face 122. Torque pad 90 (e.g., pad body 120) may be configured to transmit the force FB from pad face 122 to pad back portion 146.

Pad back portion 146 defines first support portion 124 and second support portion 126. In examples, first support portion 124 and second support portion 126 define boss recess 128. Second support portion 126 is separated from first support portion 124. In examples, second support portion 126 is separated from first support portion 124 such that first support portion 124 is displaced from second support portion 126 in the radial direction R1. For example, torque pad 90 may be configured such that first support portion 124 is displaced from second support portion 126 in the radial direction R1 when torque pad 90 is supported by boss 92 and displaced from axis A in the radial direction R1. In examples, first support portion 124 and/or second support portion 126 are configured to engage boss 92 when boss recess 128 receives boss 92.

First support portion 124 supports pin 130. First support portion 124 is configured to exert the pin force FP (FIG. 5)

on pin 130 to assist in establishing and/or maintain pin 130 within support recess 132 when boss 92 supports torque pad 90. First support portion 124 may be resiliently biased to exert the pin force FP on pin 130. In examples, the pin force FP is a force on pin 130 having a direction substantially from first support portion 124 to second support portion 126. First support portion 124 is configured such that its resilient biasing generates pin force FP in a direction toward second support portion 126 when pin 130 is displaced in a direction away from second support portion 126. For example, when torque pad 90 is supported by boss 92 and displaced from axis A in the radial direction R1, first support portion 124 may be resiliently biased to exert pin force FP on pin 130 in a direction substantially opposite the radial direction R1. The exertion of pin force FP on pin 130 may assist in retaining pin 130 within support recess 132 during operation of the brake assembly 54 such that, for example, boss 92 may act to limit movement of torque pad 90 (e.g., movement relative to torque tube) in an axial direction, radial direction, and/or a tangential direction of the wheel during the brake assembly operation. The exertion of pin force FP on pin 130 may assist in holding (e.g., retaining) torque pad 90 on boss 92 (e.g., a torque tube boss) during sub-assembly steps when, for example, torque tube 64 and torque pad 90 may be moved to various locations, such as to storage or to a new location for further assembly.

In examples, pin 130 includes a body 148 ("pin body 148") extending from first support portion 124 to a free end 150 of pin 130 ("pin free end 150"). Pin 130 may be configured such that at least pin free end 150 may position within support recess 132 when support recess 132 receives pin 130. In examples, pin 130 is configured such that pin free end 150 and at least some portion of pin body 148 positions within support recess 132 when support recess 132 receives pin 130.

In examples, first support portion 124 is configured to have a preset orientation which causes pin free end 150 to establish a first displacement relative to second support portion 126. In the present orientation, first support portion 124 may be in a substantially zero-stress position, where any stresses on first support portion 124 arise from properties or phenomena internal to first support portion 124, such as mass, internal temperature, residual stresses, and the like. First support portion 124 may be resiliently biased such that, when pin 130 is displaced in a direction away from second support portion 126 (e.g., when first support portion 124 departs from the preset orientation), first support portion 124 generates an internal stress tending to oppose an external force on first support portion 124 which caused the displacement of pin 130.

For example, when pin free end 150 is displaced to a second displacement from second support portion 126 greater than the first displacement of the preset configuration, the internal stress may act to cause first support portion 124 to attempt to establish or reestablish the preset orientation (e.g., establish or reestablish the first displacement between pin 130 and first support portion 124). For example, when a force (e.g., applied by an installer) which displaces pin 130 in a direction away from second support portion 126 is applied to first support portion 124 and/or pin 130, first support portion 124 may generate an internal stress opposing the applied force and generating pin force FP on pin 130. Pin force FP may act to substantially drive pin 130 into support recess 132, and may act to assist in retaining pin 130 within support recess 132.

In examples, second support portion 126 supports second pin 134 configured to insert within second support recess

136 of boss 92 when pin 130 is positioned within support recess 132. In examples, second pin 134 includes a body 152 ("second pin body 152") extending from second support portion 126 to a free end 154 of second pin 134 ("second pin free end 154'). Second pin 134 may be configured such that at least second pin free end 154 may position within second support recess 136 when second support recess 136 receives second pin 134. In examples, second pin 134 is configured such that second pin free end 154 and at least some portion of second pin body 152 positions within second support recess 136 when second support recess 136 receives second pin 134.

In examples, pin 130 extends from first support portion 124 in a first direction (e.g., a direction opposite radial direction R1) and second pin 134 extends from second support portion 126 in a second direction opposite the first direction (e.g., in the radial direction R1). The resilient biasing of first support portion 124 may act to cause pin force FP in a direction from pin 130 toward second pin 134. In examples, support recess 132 and the second support recess 136 are on substantially opposite sides of boss 92, such that pin 130 and second pin 134 substantially bracket boss 92 when first pin 130 inserts into support recess 132 and second pin 134 inserts into second support recess 136. In some examples, support recess 132 and second support recess 136 are portions of substantially separate volumes defined within boss 92, such that, for example, support recess 132 defines a first volume within boss 92 and second support recess 136 define a second volume within boss 92 which is separate from (e.g., non-contiguous with) the first volume. In some examples, for example as depicted in FIG. 5, support recess 132 and second support recess 136 may define openings into a substantially contiguous volume of boss 92 extending between support recess 132 and second support recess 136.

Pad body 120 (e.g., pad back portion 146) may define a back face 156. In examples, pad body 120 is configured such that back face 156 faces in a direction substantially opposite that of pad face 122. For example, pad body 120 may be configured such that when boss 92 supports torque pad 90, back face 156 faces substantially in the axial direction A1 as pad face 122 faces substantially in a direction opposite axial direction A1. In examples, back face 156 is configured to engage boss 92 at least when backing plate 88 transmits the force FB to torque pad 90. Torque pad 90 (e.g., pad body 120) may be configured to receive the force FB via pad face 122 and transmit the force FB from pad face 122 to back face 156.

In examples, pin 130 is configured to move relative to back face 156 when pin 130 is displaced in the direction away from second support portion 126. Pin 130 may be configured to move relative to back face 156 when first support portion 124 exerts pin force FP on pin 130. In examples, first support portion 124 and/or pad body 120 are configured such that torque pad 90 defines a gap G3 (FIG. 8) between pin 130 and back face 156. Torque pad 90 (e.g., first support portion 124 and/or pad body 120) may be configured to substantially retain gap G3 as pin 130 moves relative to back face 156. In examples, first support portion 124 and/or pad body 120 are configured such that torque pad 90 defines gap G3 over a displacement parallel to the axial direction A1 when boss 92 supports torque pad 90.

In examples, first support portion 124 includes a ligament 158 (FIG. 7) configured to support pin 130. Ligament 158 may be configured to support pin 130 in a manner which allows pin 130 to move relative to back face 156. In examples, ligament 158 is configured such that torque pad 90 defines gap G3 between pin 130 and back face 156. For example, ligament 158 may be configured to support pin 130 such that pin 130 is substantially suspended over back face 156. In examples, ligament 158 includes a first end 160 ("ligament first end 160") supported by pad body 120 and a second end 162 ("ligament second end 162") supporting pin 130. In examples, ligament first end 160 is attached to pad body 120 and ligament second end 162 is attached to pin body 148. Ligament 158 may be configured such that displacement of pin 130 relative to back face 156 causes movement of ligament second end 162 relative to ligament first end 160.

In some examples, first support portion 124 includes a second ligament 164 supporting pin 130. Second ligament 164 may include a first end 161 (second ligament first end 161") and a second end 163 ("second ligament second end 163") configured to support pin 130 in a manner similar to ligament first end 160 and ligament second end 162. In some examples, ligament 158 and second ligament 164 are attached to substantially opposite sides of pin body 148. In some examples, when ligament 158 supports pin 130, ligament 158 extends from ligament first end 160 to ligament second end 162 in the first tangential direction T1 (e.g., when boss 92 supports torque pad 90). In some examples, when second ligament 164 supports pin 130, ligament 164 extends from the first end of second ligament 164 to the second end of second ligament 164 in a direction opposite the first tangential direction T1 (e.g., when boss 92 supports torque pad 90).

In examples, ligament 158 and/or second ligament 164 are resiliently biased to exert the pin force FP on pin 130 when pin 130 is displaced in the direction away from second support portion 126. For example, when pin 130 is displaced in the direction away from second support portion 126, ligament 158 and/or second ligament 164 may be configured to generate the internal stress acting to cause pin force FP (e.g., acting such that first support portion 124 attempts to establish or reestablish its preset orientation). In examples, ligament 158 is configured to generate pin force FP on pin 130 when ligament first end 160 is displaced in a direction away from second support portion 126 relative to ligament second end 162. In some examples, ligament 158 and/or second ligament 164 may be configured similar to, for example, a leaf spring or other elastic element which is resiliently biased to maintain or attempt to maintain a given displacement between a first end of the element and a second end of the element.

Torque pad 90 may include a tab 166 configured to exert a force (e.g., force FT (FIG. 6)) on first support portion 124 and/or pin 130 (e.g., a force substantially in the direction of radial direction R1). Tab 166 may be configured to transmit force FT to pin 130 to cause pin 130 to displace in the direction away from section support portion 126. In examples, tab 166 is configured such that an operator (e.g., an installer) may exert force FT on tab 166 to cause the displacement of pin 130 from second support portion 126 (e.g., during installation of torque pad 90 within brake assembly 54). For example, tab 166 may be configured to exert force FT (e.g., imparted on tab 166 by the installer) to position pin 130 for insertion within support recess 132. Tab 166 may be configured such that removal and/or cessation of force FT on tab 166 causes the resilient biasing of first support portion 124 to position and/or insert pin 130 into support recess 132. In examples, tab 166 is configured to displace pin 130 in a direction away from second support portion 126 when force FT acts on tab 166 in a direction away from second support portion 126 (e.g., in the radial direction R1). In examples, tab 166 extends from first support portion 124 and/or pin body 148 in a direction substantially from pad front portion 144 (e.g., pad face 122) to pad back portion 146 (e.g., back face 156). For example, tab 166 may extend from first support portion 124 and/or pin body 148 substantially in axial direction A1 when boss 92 supports torque pad 90.

In some examples, instead of or in addition to tab 166, pin 130 (e.g., pin free end 150) is configured to slidably translate over boss 92 toward, for example, support recess 132. Pin 130 may be configured to displace in the direction away from second support portion 126 when pin 130 slidably translates over boss 92. For example, boss 92 may be configured to define a ramping surface which defines a plurality of individual displacements perpendicular to axis A. For example, the ramping surface may define a first point on the ramping surface, a second point on the ramping surface, and a third point on the ramping surface, with the second point displaced from the first point in the axial direction A1 and the third point displaced from the second point in the axial direction A1. The ramping surface may be configured such that a first individual displacement from axis A to the first point is less than a second individual displacement from axis A to the second point. The ramping surface may be configured such that the second individual displacement is less than a third individual displacement from axis A to the third point. Boss 92 may be configured such that, when a portion of torque pad 90 (e.g., second support portion 126) contacts boss 92 and pin 130 (e.g., pin free end 150) slidably translates over the ramping surface toward support recess 132, the ramping surface causes pin 130 to displace in the direction away from second support portion 126. Boss 92 may be configured such that the ramping surface allows pin 130 to slidably translate toward support recess 132 until the resilient biasing of first support portion 124 exerts force FP to cause pin 130 to position within support recess 132.

In examples, pad body 120 defines an outer perimeter 138 defining one or more cross-sectional dimensions of pad body 120. For example, outer perimeter 138 may define a first cross-sectional dimension substantially parallel to radial direction R1 and a second cross-sectional dimension substantially parallel to tangential direction T1. In examples, outer perimeter 138 may define one or more edges of pad body 120, such as a pad first edge 140 and a pad second edge 142. Pad first edge 140 and pad second edge 142 may be separated by the first cross-sectional dimension defined by outer perimeter 138. Outer perimeter 138 may define a pad third edge 141 and pad fourth edge 143. Pad first edge 140 and pad second edge 142 may be separated by the second cross-sectional dimension defined by outer perimeter 138. In examples, when torque pad 90 is supported by boss 92 and displaced from axis A in the radial direction R1, pad first edge 140 is displaced from pad second edge 142 in the radial direction R1. In examples, when torque pad 90 is supported by boss 92 and displaced from axis A in the radial direction R1, pad third edge 141 is displaced from pad fourth edge 143 in the tangential direction T1.

In some examples, as shown in FIG. 5, pad body 120 may be configured to define a first gap G1 separating pad first edge 140 and first support portion 124. In some examples, pad body 120 may be configured such that pad first edge 140 and first support portion 124 form a substantially contiguous portion of pad body 120 (e.g., such that first gap G1 is substantially absent). For example, pad body 120 may be configured such that first support portion 124 extends in the first radial direction R1 from pin 130 to pad first edge 140, such that, for example, pad body 120 defines a surface extending from pad first edge 140 to pin 130. In some examples, as shown in FIG. 5, pad body 120 may be configured to define a second gap G2 separating pad second edge 142 and second support portion 126. In some examples, pad body 120 may be configured such that pad second edge 142 and second support portion 126 form a substantially contiguous portion of pad body 120 (e.g., such that second gap G2 is substantially absent). For example, pad body 120 may be configured such that second support portion 126 extends in a direction opposite the first radial direction R1 from second pin 134 to pad second edge 142 such that, for example, pad body 120 defines a surface extending from pad second edge 142 to second pin 134.

Pad body 120 (e.g., pad front portion 144) may define pad face 122 such that pad face 122 is a surface extending over at least some portion of a displacement from pad first edge 140 to pad second edge 142. In some examples, pad face 122 may substantially extend from pad first edge 140 to pad second edge 142. In examples, pad body 120 (e.g., pad front portion 144) may define pad face 122 such that pad face 122 is a surface extending over at least some portion of a displacement from pad third edge 141 to pad fourth edge 143. In some examples, pad face 122 may substantially extend from pad third edge 141 to pad fourth edge 143. In examples, pad body 120 is configured to define pad face 122 such that at least some portion of pad face 122 may be substantially coplanar with a plane defined by radial direction R1 and tangential direction T1 when boss 92 supports torque pad 90.

In examples, torque pad 90 defines a boundary 168 ("pad boundary 168") at least partially surrounding back face 156. In examples, pad boundary 168 defines one or more of pad first edge 140, pad second edge 142, pad third edge 141, and/or pad fourth edge 143. In examples, pad boundary 168 is substantially raised relative to back face 156, such that pad boundary 168 extends in a direction away from back face 156. In examples, pad boundary 168 defines a recess 170 ("pad recess 170") within pad back portion 146. Pad recess 170 may extend into pad back portion 146 in a direction toward pad face 122. In examples, pad recess 170 is bounded at least in part by back face 156. In examples, pad body 120 (e.g., pad boundary 168) defines a back opening 171 which opens into pad recess 170. In examples, torque pad 90 is configured such that boss 92 passes through back opening 171 when boss 92 inserts into boss recess 128.

In some examples, pad body 120 defines one or more of a first wall 172, a second wall 174, a third wall 176, and/or a fourth wall 178 defining at least some portion of pad boundary 168. First wall 172 may include and/or define pad first edge 140. Second wall 174 may include and/or define pad second edge 142. Third wall 176 may include and/or define pad third edge 141. Fourth wall 178 may include and/or define pad fourth edge 143. In examples, pad body 120 (e.g., pad back portion 146) is configured such that first wall 172, second wall 174, third wall 176, and fourth wall 178 surround a volume defining pad recess 170. In examples, first wall 172, second wall 174, third wall 176, and fourth wall 178 define at least some portion of (e.g., all of) a boundary of back opening 171. In examples, pad recess 170 is bounded and/or defined at least in part by two or more of (e.g., all of) first wall 172, second wall 174, third wall 176, fourth wall 178, and/or back face 156. For example, pad recess 170 may be defined and/or bounded by back face 156, first wall 172, second wall 174, third wall 176, fourth wall 178, and back opening 171. Torque pad 90 may be configured such that at least some portion of first support portion 124 (e.g., ligament 158 and/or second ligament 164), pin 130, second base section 126, and/or second pin 134 is positioned within pad recess 170.

In some examples, first wall 172 includes (e.g., defines) pad first edge 140 facing in a direction outward from pad recess 170 (e.g., in radial direction R1) and an inner edge 180 ("first inner edge 180") facing inward toward pad recess 170 (e.g., in a direction opposite radial direction R1). Second wall 174 may include (e.g., define) pad second edge 142 facing in a direction outward from pad recess 170 (e.g., in the direction opposite radial direction R1) and an inner edge 182 ("second inner edge 182") facing inward toward pad recess 170 (e.g., in radial direction R1). Third wall 176 may include (e.g., define) pad third edge 141 facing in a direction outward from pad recess 170 (e.g., in tangential direction T1) and an inner edge 184 ("third inner edge 184") facing inward toward pad recess 170 (e.g., in a direction opposite tangential direction T1). Fourth wall 178 may include (e.g., define) pad fourth edge 143 facing in a direction outward from pad recess 170 (e.g., in the direction opposite tangential direction T1) and an inner edge 186 ("fourth inner edge 186") facing inward toward pad recess 170 (e.g., in tangential direction T1). Pad recess 170 may be bounded and/or defined at least in part by two or more of (e.g., all of) first inner edge 180, second inner edge 182, third inner edge 184, and/or fourth inner edge 186. In examples, pad recess 170 is defined and/or bounded by back face 156, first inner edge 180, second inner edge 182, third inner edge 184, fourth inner edge 186, and back opening 171.

In some examples, pad boundary 120 supports first support portion 124 and/or second support portion 126. Pad boundary 120 may support first support portion 124 such that torque pad 90 defines gap G3 between back face 156 and first support portion 124. In examples, pad boundary 120 supports second support portion 126 such that torque pad 90 defines a gap G4 between back face 156 and second support portion 126. In examples, third inner edge 184 is coupled to an end of first support portion 124 (e.g., second ligament first end 161) and fourth inner edge 186 is coupled to another end of first support portion 124 (e.g., ligament first end 160), such that first support portion 124 substantially spans a displacement from third inner edge 184 to fourth inner edge 186. In examples, third inner edge 184 is coupled to a first end 125 of second support portion 126 and fourth inner edge 186 is coupled to a second end 127 of second support portion 126, such that first support portion 124 substantially spans a displacement from third inner edge 184 to fourth inner edge 186.

Torque pad 90 may be configured such that torque pad body 120 may move relative to boss 92 to assist in establishing a loading path for forces transferred from backing plate 88 (FIGS. 2-5) to boss 92. In examples, torque pad 90 (e.g., torque pad body 120) defines one or more convex surfaces configured to assist in establishing the loading path. The convex surface of the one or more convex surfaces may be configured to transmit forces from backing plate 88 to boss 92 in a direction substantially normal to the convex surface, or in a direction closer to normal than might be present in the absence of the convex surface. In examples, torque pad 90 is configured to move (e.g., shift) relative to boss 92 when the convex surface transmits force to and/or receives forces from boss 92.

For example, backing plate 88 may be configured to impart a force generally in the first tangential direction T1 on pad fourth edge 143 during operations of brake assembly 54. Fourth wall 178 may be configured to transfer the force from pad fourth edge 143 to boss 92 via fourth inner edge 186.

Fourth inner edge 186 may be configured to define a convex surface CV1 configured to allow torque pad 90 to move relative to boss 92 when pad fourth edge 143 receives the force from backing plate 88, such that fourth inner edge 186 transmits the force to boss 92 in a direction substantially normal to convex surface CV1. For example, in response to a force from backing plate 88 to pad fourth edge 143 in a direction deviating from tangential direction T1, contact between boss 92 and convex surface CV1 of fourth inner edge 186 may cause torque pad 90 (e.g., torque pad body 120) to pivot slightly until the force from backing plate 88 transmits through the convex surface CV1 to boss 92 in the direction substantially normal to the convex surface CV1 or closer to normal to convex surface CV1. Hence, fourth inner edge 186 may be configured to permit movement of torque pad 90 relative to boss 92 such that fourth inner edge 186 transmits forces to boss 92 in a direction substantially normal or closer to normal to fourth inner edge 186.

In examples, convex surface CV1 is configured to bow inward toward pin 130 (e.g., bow inward in the first tangential direction T1). In examples, third inner edge 184 defines a convex surface CV2 configured to allow torque pad 90 to move relative to boss 92 when pad third edge 141 receives a force from backing plate 88 such that, for example, third inner edge 184 transmits the force to boss 92 in a direction substantially normal to convex surface CV2, or in a direction closer to a normal of CV2 than might be present in the absence of convex surface CV2. Convex surface CV2 may be configured to bow inward toward pin 130 (e.g., bow inward in a direction opposite first tangential direction T1).

Torque pad 90 may be configured such that torque pad body 120 may move relative to boss 92 when backing plate 88 imparts force FB on torque pad 90. Torque pad 90 may move relative to boss 92 to assist in establishing a loading path for force FB. For example, back face 156 may be configured to define a convex surface CV3 configured to allow torque pad 90 to move relative to boss 92 when pad face 122 receives the force FB from backing plate 88. In examples, convex surface CV3 is configured to bow inward toward pin 130 (e.g., bow inward in the axial direction A1). Convex surface CV3 may be configured such that back face 156 transmits the force FB to boss 92 in a direction substantially normal to convex surface CV3, or in a direction closer to a normal of CV3 than might be present in the absence of convex surface CV3. In examples, torque pad 90 (e.g., pad body 120) is configured to transmit at least some portion of force FB over a compression axis CA extending through pad face 122 and back face 156. Back face 156 may be configured such that compression axis CA intersects convex surface CV3.

For example, in response to force FB imparted from backing plate 88 in a direction deviating from axial direction A1, contact between boss 92 and convex surface CV3 may cause torque pad 90 (e.g., torque pad body 120) to pivot slightly until the force FB from backing plate 88 transmits through the convex surface CV3 to boss 92 in the direction substantially normal to or closer to a normal of convex surface CV3. Hence, back face 156 may be configured to permit movement of torque pad 90 relative to boss 92 such that back face 156 transmits the force FB to boss 92 in a direction substantially normal to or closer to a normal of back face 156.

In examples, as discussed, torque pads 108 and bosses 110 may be radially displaced from axis A around perimeter P (FIG. 3). In some examples, one or more of torque pads 108 and/or one or more of bosses 110 may be radially displaced from axis A by an individual radius from axis A. The individual radii may define a different displacement for each of torque pads 108 and/or bosses 110 and/or substantially similar displacements for one or more of torque pads 108 and/or bosses 110. In examples, brake assembly 54 is configured such that torque pads 108 and/or bosses 110 define a substantially circumferential pattern around axis A. Torque pads 108 and/or bosses 110 may be evenly or unevenly spaced around axis A. For example, torque pads 108 and/or bosses 110 may be spaced such that a spacing distance (e.g., an arc length) between an adjacent torque pad or boss is substantially equal around axis A. In examples, torque pads 108 and/or bosses 110 may be spaced such that the spacing distance (e.g., the arc length) between an adjacent torque pad or boss varies around axis A. The spacing distance and/or arc length may be defined in a plane substantially perpendicular to axis A.

Torque pads described herein, including torque pad 90, second torque pad 94, third torque pad 98, and/or other of torque pads 108, as well as wheel 10 and brake assembly 54, and the components thereof, may be made from any suitable material. For example, the material may be any material of suitable strength for the intended use of one or more of torque pads 108, wheel 10, brake assembly 54, and the components thereof. In some examples, the material includes a metal or a metal alloy, such as an Inconel. In some examples, the material may include a nickel alloy or steel alloy, such as a stainless steel.

Torque pads 108, wheel 10, brake assembly 54, and the components thereof may be formed using any suitable technique. Torque pads 108, wheel 10, brake assembly 54, and the components thereof may be forged, casted, made from bar stock, additive manufactured (e.g., three-dimensionally (3D) printed), extruded, drawn, or be produced using other suitable methods. In some examples, torque pads 108, wheel 10, brake assembly 54, and the components thereof may be machined to define the configurations described herein. In other examples, torque pads 108, wheel 10, brake assembly 54, and the components thereof may be formed without having to be substantially machined.

Disc stack 65 may include components additional to those depicted in FIGS. 2-8 and/or described above. For example, disc stack 65 can include one or more rotor drive inserts configured to insert at least partially within a drive slot of rotor disc 66, 68, 70, 72. As another example, disc stack 65 may include one or more spline inserts configured to insert at least partially within a spline slot of stator disc 74, 76, 78. As used herein, disc stack 65 may include one or more rotor discs such as rotor disc 66, 68, 70, 72, one or more stator discs such as stator disc 74, 76, 78, and other components configured to rotate and/or translate as a substantially rigid body with at least one of the rotor discs and/or the stator discs.

Brake discs described herein, including rotor discs 66, 68, 70, 72 and stator discs 74, 76, 78, may be manufactured from any suitable material. In some examples, the brake discs described herein may be manufactured from a metal or a metal alloy, such as a steel alloy. In some examples, the brake discs may be manufactured using a ceramic material, such as a ceramic composite. In some examples, the brake discs may be manufactured from a carbon-carbon composite material. In some examples, the brake discs may be manufactured using a carbon-carbon composite material having a high thermal stability, a high wear resistance, and/or stable friction properties. The brake discs may include a carbon material with a plurality of carbon fibers and densifying material. The carbon fibers may be arranged in a woven or non-woven as either a single layer or multilayer structure.

As used here, when a first portion of a system (e.g., brake assembly 54) is substantially parallel to a second portion of or an axis defined by the system, this may mean the first portion is parallel or nearly parallel to the second portion or the axis to the extent permitted by manufacturing tolerances. In some examples, when the first portion is substantially parallel to the second portion or the axis, this may mean a first vector defined by the first component of the system defines an angle of less than 10 degrees, in some examples less than 5 degrees, and in some examples less than 1 degree, with a second vector defined by the second component or the axis. When a first portion of the system is substantially perpendicular to a second portion of or an axis defined by the system, this may mean the first portion is perpendicular or nearly perpendicular to the second portion or the axis to the extent permitted by manufacturing tolerances. In some examples, when the first portion is substantially perpendicular to the second portion or the axis, this may mean that the first vector defined by the first component of the system defines an angle of at least 80 degrees, in some examples at least 85 degrees, and in some examples at least 89 degrees, with the second vector defined by the second component.

As used here, when a first portion of a system (e.g., brake assembly 54) supports a second portion of the system, this means that when the second portion causes a first force to be exerted on the first portion, the first portion causes a second force to be exerted on the second portion in response to the first force. The first force and/or second force may be a contact force and/or an action-at-a-distance force. For example, first force and/or second force may be mechanical force, a magnetic force, a gravitational force, or some other type of force. The first portion of the system may be a portion of the system or a portion of a component of the system. The second portion of the system may be another portion of the system or another portion of the same component or a different component. In some examples, when the first portion of the system supports the second portion of the system, this may mean the second portion is mechanically supported by and/or mechanically connected to the first portion.

Figure 9:
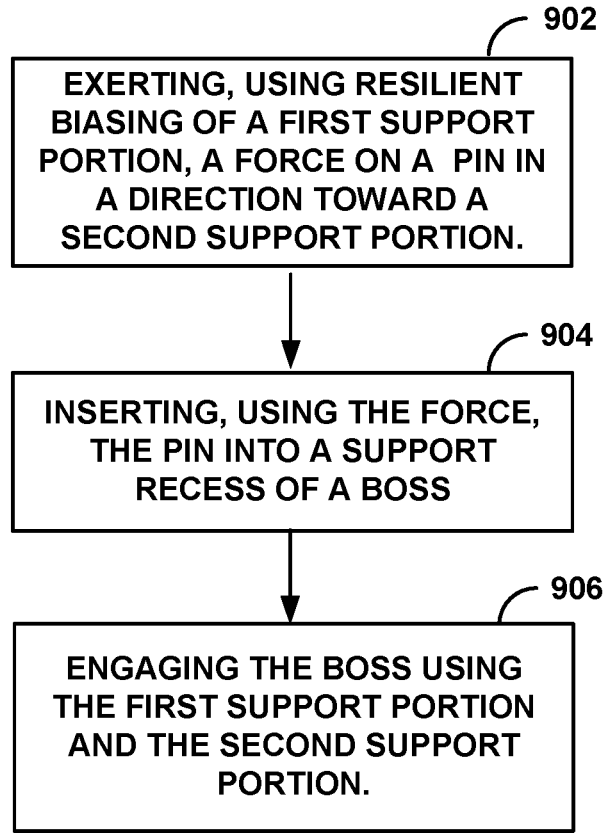
FIG. 9 is a flow diagram illustrating an example method of supporting a torque pad using a boss of a brake assembly.

FIG. 9 is a flow diagram illustrating an example technique for supporting a torque pad using a boss of a brake assembly. While the technique is described with reference to torque pad 90 and brake assembly 54 described herein, the technique may be used with other components in other examples.

The technique includes exerting, using the resilient biasing of first support portion 124 of torque pad 90, force FP on pin 130 in a direction toward second support portion 126 of torque pad 90. In examples, first support portion 124 exerts force FP on pin 130 when first support portion 124 is displaced in a direction away from second support portion 126. A ligament 158 and/or second ligament 164 may exert FP force on pin 130. Ligament 158 and/or second ligament 164 may exerts force FP on pin 130 when Ligament 158 and/or second ligament 164 displace in the direction away from second support portion 126.

In examples, first support portion 124 exerts force FP on pin 130 when boss 92 is displaced in first radial direction R1 of brake assembly 54 from axis of rotation A of wheel 10, and first support portion 124 is displaced in first radial direction R1 from second support portion 126. First support portion 124 may exert force FP on pin 130 in a direction opposite first radial direction R1 when first support portion 124 is displaced in first radial direction R1 from second support portion 126. In examples, first support portion 124 exerts force FP on pin 130 in a direction toward second pin 134 supported by second support portion 126. Second pin 134 may be positioned within a second support recess 136 of boss 92.

The technique includes inserting, using the force FP exerted by first support portion 124, pin 130 into support recess 132 of boss 92 (904). First support portion 124 may position and/or substantially establish pin 130 within support recess 132 using the force on pin 130. In examples, second pin 134 is inserted in second support recess 136, and the resilient biasing of first support portion 124 substantially establishes and/or maintain second pin 134 in its position within second support recess 136. In examples, pin 130 moves relative to back face 156 of torque pad 90 when pin 130 inserts into support recess 132.

The technique includes engaging boss 92 using first support portion 124 and second support portion 126 (906). Boss 92 may support torque pad 90 using at least first support portion 124 and second support portion 126. Boss 92 may support torque pad 90 when backing plate 88 exerts force FB on torque pad 90. In examples, backing plate 88 exerts force FB on pad face 122 of torque pad 90. Pad body 120 may transmit force FB from pad face 122 to back face 156. Back face 156 may transmit force FB to boss 92. In examples, boss 92 limits movement of torque pad 90 relative to boss 92 and/or another component of brake assembly 54 in the axial direction A1, the radial direction R1, and/or the tangential direction T1 when backing plate 88 exerts force FB on torque pad 90.

In examples, tab 166 exerts a force on pin 130 to displace pin 130 in the direction away from second support portion 126. Tab 166 may exert the force on pin 130 when an installer exerts a force on tab 166. In examples, second support portion 126 exerts a reaction force from boss 92 to torque pad 90 when tab 166 exerts the force on pin 130 to cause the displacement of pin 130 in the direction away from second support portion 126. In some examples, ramping surface of boss 92 exerts the force on pin 130 to displace pin 130 in the direction away from second support portion 126. The resilient biasing of first support portion 124 may act to cause pin 130 to position within support recess 132 when the force causing displacement of pin 130 away from second support portion 126 ceases and pin 130 is positioned to insert within support recess 132.

Torque pad 90 may move (e.g., shift and/or pivot slightly) relative to boss 92 when backing plate 88 imparts force FB on torque pad 90. In examples, torque pad body 120 moves relative to boss 92 when convex surface CV3 of back face 156 transmits the force imparted by backing plate 88 (e.g., force FB) to boss 92. Convex surface CV3 may establish a loading path for the force imparted by backing plate 88 based on the movement of torque pad 90 relative to boss 92. In examples, convex surface CV3 causes back face 156 to transmit the force imparted by backing plate 88 to boss 92 in a direction substantially normal or closer to normal to convex surface CV3 when convex surface CV3 transmits the force imparted by backing plate 88 on torque pad 90 to boss 92.

Torque pad 90 may move (e.g., shift and/or pivot slightly) relative to boss 92 when backing plate 88 imparts a force generally in the first tangential direction T1 on pad fourth edge 143. In examples, torque pad body 120 moves relative to boss 92 when convex surface CV1 of fourth wall 178 transmits the force imparted by backing plate 88 to boss 92. Convex surface CV1 may establish a loading path for the force imparted by backing plate 88 based on the movement of torque pad 90 relative to boss 92. In examples, convex surface CV1 causes fourth wall 178 to transmit the force from backing plate 88 to boss 92 in a direction substantially normal or closer to normal to convex surface CV1 when convex surface CV1 transmits the force imparted by backing plate 88 to boss 92. In examples, convex surface CV2 causes third wall 176 to transmit a force from backing plate 88 to boss 92 in a direction substantially normal or closer to normal to convex surface CV2 when convex surface CV2 transmits the force imparted by backing plate 88 to boss 92.

The present disclosure includes the following examples.

Example 1: A torque pad comprising: a pad body defining a front portion and a back portion opposite the front portion, the front portion defining a pad face configured to engage a backing plate of a braking system, wherein the back portion defines a first support portion and a second support portion separated from the first support portion, wherein the first support portion and the second support portion are configured to receive a boss of the braking system such that the boss supports the pad body, wherein the first support portion supports a pin configured to insert into a support recess of the boss when the boss supports the pad body, and wherein the first support portion is resiliently biased to exert a force on the pin in a direction toward the second support portion when the pin is displaced in a direction away from the second support portion.

Example 2: The torque pad of example 1, wherein the pin extends from the first support portion to a pin free end, wherein the pin free end is configured to position within the support recess when the pin is inserted into the support recess and the boss supports the pad body.

Example 3: The torque pad of example 1 or example 2, wherein the second support portion defines a second pin configured to insert into a second support recess of the boss when the pin is inserted into the support recess and the boss supports the pad body.

Example 4: The torque pad of any of examples 1-3, wherein the pin extends in a first direction from the first support portion to a pin free end, and wherein the second pin extends in a second direction from the second support portion to a second pin free end, wherein the second direction is opposite the first direction.

Example 5: The torque pad of any of examples 1-4, wherein the pad body defines a boss recess between the first support portion and the second support portion, and wherein the boss recess is configured to receive the boss when the pin is inserted into the support recess and the boss supports the pad body.

Example 6: The torque pad of any of examples 1-5, wherein the pad body defines a tab configured to displace the pin in the direction away from the second support portion when a force in the direction away from the second support portion is applied to the tab.

Example 7: The torque pad of any of examples 1-6, wherein the first support portion includes a ligament including a first end attached to the pad body and a second end attached to the pin, wherein the ligament is configured to exert the force on the pin in the direction toward the second support portion when the second end is displaced relative to the first end in the direction away from the second support portion.

Example 8: The torque pad of any of examples 1-7, wherein the pad body defines a back face between the pad face and the pin, wherein the pin is configured to move relative to the back face when the pin is displaced in the direction away from the second support portion.

Example 9: The torque pad of any of examples 1-8, wherein the second support portion defines a second pin configured to insert into a second support recess of the boss when the pin is inserted into the support recess and the boss supports the pad body, and wherein the pin is configured to displace in a direction away from the second pin when the pin is displaced in the direction away from the second support portion.

Example 10: The torque pad of any of examples 1-9, wherein the back portion defines a back face configured to transmit a force from the backing plate to the boss when the boss supports the pad body and the backing plate exerts the force on the pad body.

Example 11: The torque pad of example 10, wherein the pad body is configured to transmit at least some portion of the force over a compression axis extending through the pad face and the back face, and wherein the back face defines a convex surface intersected by the compression axis.

Example 12: The torque pad of example 10 of example 11, wherein the pad body defines a pad boundary defining a pad recess configured to receive the boss when the pin is inserted into the support recess and the boss supports the pad body, and wherein the pad boundary surrounds at least some portion of the back face.

Example 13: The torque pad of example 12, wherein the pad boundary supports at least one of the first support portion or the second support portion.

Example 14: The torque pad of example 12 or example 13, wherein a portion of the pad boundary defines at least one convex surface configured to engage the boss when the pin is inserted into the support recess and the boss supports the pad body.

Example 15: The torque pad of any of examples 1-14, further comprising: a torque tube defining the boss, and the backing plate, wherein the pad body is configured to insert into a backing plate pocket defined by the backing plate when the pin is inserted into the support recess and the boss supports the pad body.

Example 16: A torque pad comprising: a pad body defining a front portion and a back portion opposite the front portion, the front portion defining a pad face configured to engage a backing plate of a braking system and a back face opposite the pad face, wherein the back portion defines a first support portion and a second support portion separated from the first support portion, wherein the first support portion and the second support portion are configured to engage a torque tube boss of a torque tube such that the torque tube boss supports the pad body, wherein the first support portion defines a first pin configured to insert into a support recess of the torque tube boss when the torque tube boss supports the pad body, wherein the second support portion defines a second pin configured to insert into a second support recess of the torque tube boss when the torque tube boss supports the pad body, wherein the first support portion is resiliently biased to exert a force on the first pin in a direction toward the second pin when the first pin is displaced in a direction away from the second pin, and wherein the first pin is configured to move relative to the back face when the first pin is displaced in the direction away from the second pin.

Example 17: The torque pad of example 16, wherein the pad body defines a tab configured to displace the first pin in the direction away from the second pin when a force in the direction away from the second support portion is applied to the tab.

Example 18: The torque pad of example 16 or example 17, wherein the first support portion defines a ligament including a first end attached to the pad body and a second end attached to the first pin, wherein the ligament is configured to exert the force on the first pin in the direction toward the second support portion when the second end is displaced relative to the first end in the direction away from the second support portion, and wherein the ligament is configured to move relative to the back face when the first pin moves relative to the back face.

Example 19: A method comprising: exerting, using resilient biasing of a first support portion of a back portion of a torque pad, a force on a pin supported by the first support portion in a direction toward a second support portion of the back portion, wherein the first support portion exerts the force in the direction toward the second support portion when the pin is displaced in a direction away from the second support portion; inserting, using the force on the pin, the pin into a support recess of a boss of a brake assembly, wherein the torque pad includes a pad body defining the back portion and a front portion opposite the back portion, the front portion defining a pad face configured to engage a backing plate of the brake assembly; and engaging the boss using the first support portion and the second support portion such that the boss supports the pad body.

Example 20: The method of example 19, further comprising displacing, using a tab of the torque pad, the first pin in the direction away from the second support portion to insert the pin into the support recess.

Various examples have been described. These and other examples are within the scope of the following claims.

What is claimed is:

1. A torque pad comprising:
a pad body defining a front portion and a back portion opposite the front portion, the front portion defining a pad face configured to engage a backing plate of a braking system,
wherein the back portion defines a first support portion and a second support portion separated from the first support portion, wherein the first support portion and the second support portion are configured to receive a boss of the braking system such that the boss supports the pad body,
wherein the first support portion supports a first pin configured to insert into a support recess of the boss when the boss supports the pad body,
wherein the first support portion is resiliently biased to exert a force on the first pin in a direction toward the second support portion when the first pin is displaced in a direction away from the second support portion, and
wherein the pad body defines a tab configured to displace the first pin in the direction away from the second support portion in response to a force in the direction away from the second support portion is applied to the tab.

2. The torque pad of claim 1, wherein the first pin extends from the first support portion to a first pin free end, wherein the first pin free end is configured to position within the support recess when the first pin is inserted into the support recess and the boss supports the pad body.

3. The torque pad of claim 1, wherein the second support portion defines a second pin configured to insert into a second support recess of the boss when the first pin is inserted into the support recess and the boss supports the pad body.

4. The torque pad of claim 3, wherein the first pin extends in a first direction from the first support portion to a first pin free end, and wherein the second pin extends in a second direction from the second support portion to a second pin free end, wherein the second direction is opposite the first direction.

5. The torque pad of claim 1, wherein the pad body defines a boss recess between the first support portion and the second support portion, and wherein the boss recess is configured to receive the boss when the first pin is inserted into the support recess and the boss supports the pad body.

6. The torque pad of claim 1, further comprising:
a torque tube defining the boss, and
the backing plate,
wherein the pad body is configured to insert into a backing plate pocket defined by the backing plate when the first pin is inserted into the support recess and the boss supports the pad body.

7. The torque pad of claim 1, wherein the first support portion includes a ligament including a first end attached to the pad body and a second end attached to the first pin, wherein the ligament is configured to exert the force on the first pin in the direction toward the second support portion when the second end is displaced relative to the first end in the direction away from the second support portion.

8. The torque pad of claim 1, wherein the pad body defines a back face between the pad face and the first pin, wherein the first pin is configured to move relative to the back face when the first pin is displaced in the direction away from the second support portion.

9. The torque pad of claim 1, wherein the second support portion defines a second pin configured to insert into a second support recess of the boss when the first pin is inserted into the support recess and the boss supports the pad body, and wherein the first pin is configured to displace in a direction away from the second pin when the first pin is displaced in the direction away from the second support portion.

10. The torque pad of claim 1, wherein the back portion defines a back face configured to transmit a force from the backing plate to the boss when the boss supports the pad body and the backing plate exerts the force on the pad body.

11. The torque pad of claim 10, wherein the pad body is configured to transmit at least some portion of the force over a compression axis extending through the pad face and the back face, and wherein the back face defines a convex surface intersected by the compression axis.

12. The torque pad of claim 10, wherein the pad body defines a pad boundary defining a pad recess configured to receive the boss when the first pin is inserted into the support recess and the boss supports the pad body, and wherein the pad boundary surrounds at least some portion of the back face.

13. The torque pad of claim 12, wherein the pad boundary supports at least one of the first support portion or the second support portion.

14. The torque pad of claim 12, wherein a portion of the pad boundary defines at least one convex surface configured to engage the boss when the first pin is inserted into the support recess and the boss supports the pad body.

15. A torque pad comprising:
a pad body defining a front portion and a back portion opposite the front portion, the front portion defining a pad face configured to engage a backing plate of a braking system and a back face opposite the pad face,
wherein the back portion defines a first support portion and a second support portion separated from the first support portion, wherein the first support portion and the second support portion are configured to engage a torque tube boss of a torque tube such that the torque tube boss supports the pad body, wherein the first support portion defines a first pin configured to insert into a support recess of the torque tube boss when the torque tube boss supports the pad body, wherein the second support portion defines a second pin configured to insert into a second support recess of the torque tube boss when the torque tube boss supports the pad body, wherein the first support portion is resiliently biased to exert a force on the first pin in a direction toward the second pin when the first pin is displaced in a direction away from the second pin, and wherein the first pin is configured to move relative to the back face when the first pin is displaced in the direction away from the second pin.

16. The torque pad of claim 15, wherein the pad body defines a tab configured to displace the first pin in the direction away from the second pin when a force in the direction away from the second support portion is applied to the tab.

17. The torque pad of claim 15, wherein the first support portion defines a ligament including a first end attached to the pad body and a second end attached to the first pin, wherein the ligament is configured to exert the force on the first pin in the direction toward the second support portion when the second end is displaced relative to the first end in the direction away from the second support portion, and wherein the ligament is configured to move relative to the back face when the first pin moves relative to the back face.

18. A method comprising:

exerting, using resilient biasing of a first support portion of a back portion of a torque pad, a force on a first pin supported by the first support portion in a direction toward a second support portion of the back portion, wherein the first support portion exerts the force in the direction toward the second support portion when the first pin is displaced in a direction away from the second support portion;

inserting, using the force on the first pin, the first pin into a support recess of a boss of a brake assembly, wherein the torque pad includes a pad body defining the back portion and a front portion opposite the back portion, the front portion defining a pad face configured to engage a backing plate of the brake assembly;

displacing, using a tab of the torque pad, the first pin in the direction away from the second support portion to insert the first pin into the support recess; and engaging the boss using the first support portion and the second support portion such that the boss supports the pad body.

* * * * *